(12) United States Patent  
Dellock et al.

(10) Patent No.: US 11,975,687 B2  
(45) Date of Patent: May 7, 2024

(54) VEHICLE RUNNING BOARD AND RUNNING BOARD MANUFACTURING METHOD

(71) Applicant: Ford Global Technologies, LLC, Dearborn, MI (US)

(72) Inventors: Paul Kenneth Dellock, Northville, MI (US); Patrick J. Reed, Livonia, MI (US); David Brian Glickman, Southfield, MI (US); Stuart C. Salter, White Lake, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 17/324,223

(22) Filed: May 19, 2021

(65) Prior Publication Data

US 2022/0371515 A1 Nov. 24, 2022

(51) Int. Cl.
*B60R 3/00* (2006.01)
*B62D 29/00* (2006.01)
*B62D 29/04* (2006.01)
*B62D 65/16* (2006.01)

(52) U.S. Cl.
CPC ............ *B60R 3/002* (2013.01); *B62D 29/008* (2013.01); *B62D 29/041* (2013.01); *B62D 65/16* (2013.01)

(58) Field of Classification Search
CPC ......... B60R 3/002; B60R 3/00; B62D 29/008; B62D 29/041; B62D 65/16
USPC ........................................................ 280/163
See application file for complete search history.

(56) References Cited

U.S. PATENT DOCUMENTS

| 1,745,790 | A | | 10/1925 | Geyer | |
|---|---|---|---|---|---|
| 5,341,894 | A | * | 8/1994 | Van Gorder, Jr. .... | B60W 10/18 297/DIG. 10 |
| 6,095,268 | A | * | 8/2000 | Jones, Jr. ............... | B60L 15/007 180/65.6 |
| 7,168,721 | B2 | * | 1/2007 | Mulder .................... | B60R 3/00 280/169 |
| 7,287,797 | B1 | * | 10/2007 | Belloso .................. | B62D 21/03 296/193.07 |
| 7,360,779 | B2 | * | 4/2008 | Crandall ................. | B60R 3/002 248/231.91 |
| 7,946,604 | B2 | * | 5/2011 | Crandall ................. | B60R 3/002 280/169 |
| 8,152,187 | B1 | * | 4/2012 | Crandall ................. | B60R 3/002 280/169 |

(Continued)

FOREIGN PATENT DOCUMENTS

| CN | 111791802 A | 10/2020 |
|---|---|---|
| DE | 10046493 A1 | 5/2001 |

(Continued)

*Primary Examiner* — James A Shriver, II
*Assistant Examiner* — Hilary L Johns
(74) *Attorney, Agent, or Firm* — Vichit Chea; Carlson, Gaskey & Olds, P.C.

(57) ABSTRACT

A vehicle running board assembly includes, among other things, a reinforcing insert, and a beam that is extruded over the reinforcing insert. A step pad is extruded over the beam. A vehicle running board manufacturing method according to another exemplary aspect of the present disclosure includes, among other things, extruding a beam over a reinforcing insert, extruding a step pad over the beam, and cutting the beam, the reinforcing insert, and the step pad to provide the running board.

19 Claims, 4 Drawing Sheets

(56) References Cited

U.S. PATENT DOCUMENTS

| | | | | |
|---|---|---|---|---|
| 9,707,898 B1* | 7/2017 | Dellock | ............ | B29C 48/022 |
| 11,465,540 B2* | 10/2022 | Sugiyama | ............ | A47C 7/72 |
| 11,541,815 B2* | 1/2023 | Schoonover | ............ | B60R 3/002 |
| 2003/0006576 A1* | 1/2003 | Lanoue | ............ | B60R 3/002 |
| | | | | 280/163 |
| 2005/0052080 A1* | 3/2005 | Maslov | ............ | H02K 16/04 |
| | | | | 307/10.1 |
| 2005/0067741 A1* | 3/2005 | Chapman | ............ | B29C 49/20 |
| | | | | 264/516 |
| 2006/0205317 A1* | 9/2006 | Benassi | ............ | A63H 17/002 |
| | | | | 446/95 |
| 2007/0126201 A1* | 6/2007 | Crandall | ............ | B60R 3/002 |
| | | | | 280/163 |
| 2008/0258421 A1* | 10/2008 | Crandall | ............ | B60R 3/002 |
| | | | | 280/163 |
| 2013/0323454 A1* | 12/2013 | Chapman | ............ | B29C 49/20 |
| | | | | 428/74 |
| 2017/0239872 A1* | 8/2017 | Chapman | ............ | B29C 49/04 |
| 2018/0170266 A1* | 6/2018 | Dellock | ............ | B29C 48/0013 |
| 2020/0361386 A1* | 11/2020 | Schoonover | ............ | B60R 3/002 |
| 2021/0213884 A1* | 7/2021 | Dellock | ............ | B32B 37/15 |
| 2022/0135136 A1* | 5/2022 | Halonen | ............ | B62D 27/065 |
| | | | | 296/209 |
| 2022/0297606 A1* | 9/2022 | Migdal | ............ | B60R 3/002 |

FOREIGN PATENT DOCUMENTS

| | | |
|---|---|---|
| EP | 0372745 B1 | 1/1994 |
| IN | 4125MUM2013 | 11/2015 |

\* cited by examiner

VEHICLE RUNNING BOARD AND RUNNING BOARD MANUFACTURING METHOD

TECHNICAL FIELD

This disclosure relates generally to a vehicle running board and, more particularly, to a running board formed from structures that are extruded over a reinforcing insert.

BACKGROUND

Many vehicles, in particular, sport utility vehicles and trucks, include running boards. A user can step on a surface of a running board to assist with entering or exiting the vehicle.

SUMMARY

A vehicle running board assembly according to an exemplary aspect of the present disclosure includes, among other things, a reinforcing insert, and a beam that is extruded over the reinforcing insert. A step pad is extruded over the beam.

In another exemplary embodiment of the foregoing assembly, the reinforcing insert is roll-formed.

In another exemplary embodiment of any of the foregoing assemblies, the reinforcing insert is a metal or metal alloy.

In another exemplary embodiment of any of the foregoing assemblies, the beam is polymer-based.

In another exemplary embodiment of any of the foregoing assemblies, the beam includes a glass-filled polypropylene.

In another exemplary embodiment of any of the foregoing assemblies, the beam includes an adhesive resin that bonds the beam to the reinforcing insert.

In another exemplary embodiment of any of the foregoing assemblies, the beam encapsulates the reinforcing insert.

In another exemplary embodiment of any of the foregoing assemblies, the step pad includes ribs.

In another exemplary embodiment of any of the foregoing assemblies, the step pad is a thermoplastic elastomer.

Another exemplary embodiment of any of the foregoing assemblies includes vehicle attachment brackets secured to the beam with mechanical fasteners.

In another exemplary embodiment of any of the foregoing assemblies, the mechanical fasteners are spaced a distance from the reinforcing insert such that the mechanical fasteners do not extend through any portion of the reinforcing insert.

In another exemplary embodiment of any of the foregoing assemblies, each of the mechanical fasteners is received within a bore that does not extend through the reinforcing insert.

A vehicle running board manufacturing method according to another exemplary aspect of the present disclosure includes, among other things, extruding a beam over a reinforcing insert, extruding a step pad over the beam, and cutting the beam, the reinforcing insert, and the step pad to provide the running board.

Another embodiment of the foregoing method includes roll-formed reinforcing insert prior to extruding the beam over the reinforcing insert.

In another exemplary embodiment of any of the foregoing methods, the step pad bonds to the beam when extruding the step pad over the beam.

Another exemplary embodiment of any of the foregoing methods includes securing the running board to vehicle attachment brackets using mechanical fasteners.

Another exemplary embodiment of any of the foregoing methods includes securing without the mechanical fasteners extending through the reinforcing insert.

Another exemplary embodiment of any of the foregoing methods includes incorporating an adhesive resin into the beam. The adhesive resin bonds the beam to the reinforcing insert.

In another exemplary embodiment of any of the foregoing methods, the beam and the step pad are polymer-based. The reinforcing insert is a metal or metal alloy.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a vehicle running board assembly having polymer-based structures extruded over a reinforcing insert to provide a reinforced, extruded structure. A running board assembly of a desired length is then cut from the reinforced, extruded structure. This method of manufacturing a running board can facilitate providing running boards of different lengths without requiring substantial tooling and manufacturing changes.

Figure 1:
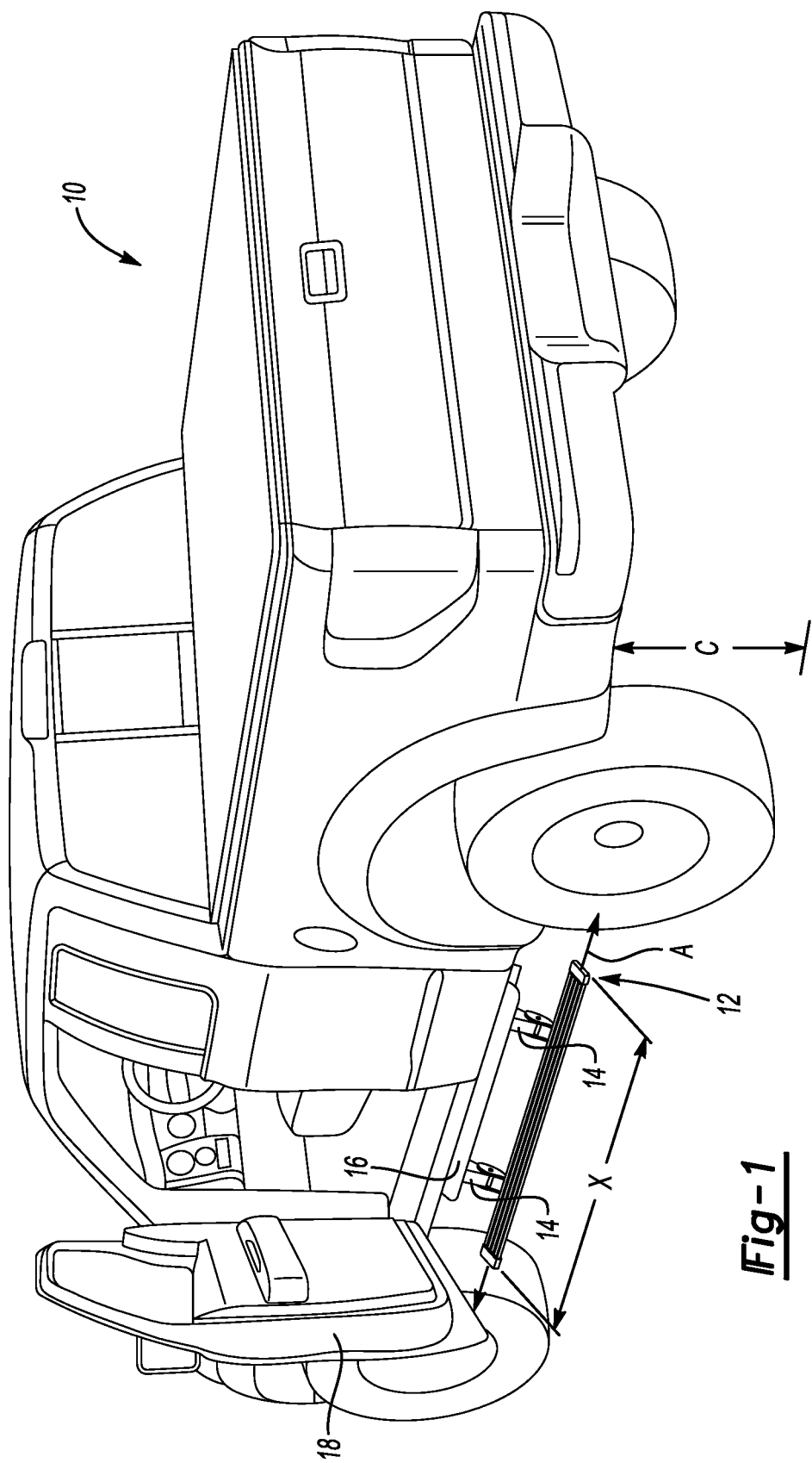
FIG. 1 illustrates a rear perspective view of the vehicle.

With reference to FIG. 1, a vehicle 10 has a relatively high clearance C, which is a distance between a ground surface and a floor of the vehicle 10. The vehicle 10 is a truck. The teachings of this disclosure are applicable to other vehicles having a relatively high clearance C, such as sport utility vehicles and other types of vehicles.

The vehicle 10 includes a running board assembly 12. Vehicle attachment brackets 14 couple the running board assembly 12 to a vehicle body 16, which includes a frame and panels of the vehicle 10. The running board assembly 12 extends longitudinally along an axis A. The running board assembly 12 an axial length X that at least spans a width of a door 18 of the vehicle 10.

The running board assembly 12, in some examples, can be a retractable running board assembly that is movable between the deployed position shown and a retracted position. While the retractable running board assemblies is shown, it should be understood that this disclosure extends to running board assemblies that are not retractable. That is, it should be understood that the running board assembly 12 could instead be a running board assembly that is stationary (i.e., not movable between a deployed position and a retractable position).

Figure 2:
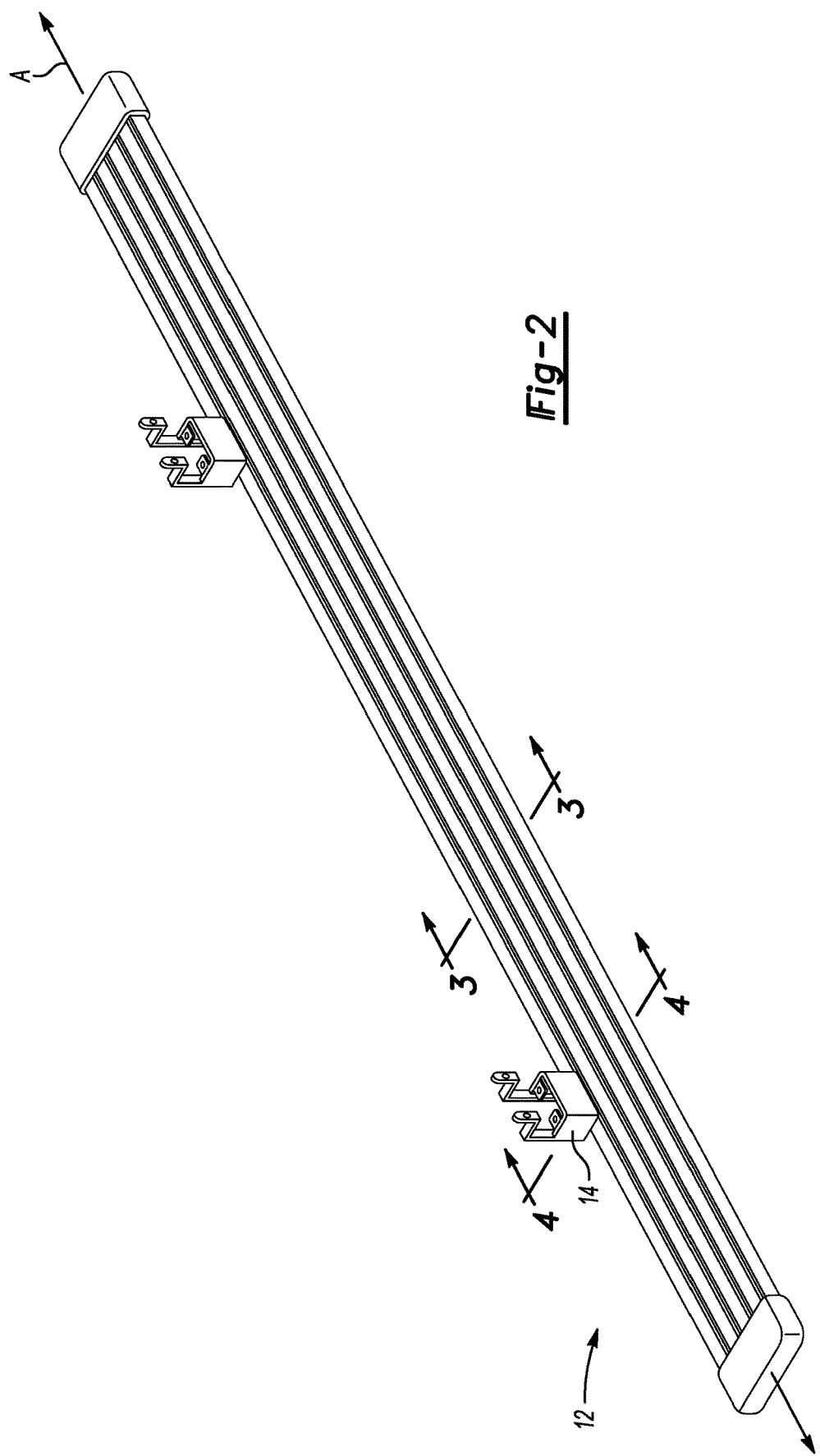
FIG. 2 illustrates a perspective view of a running board assembly from the vehicle of FIG. 1.
Figure 3:
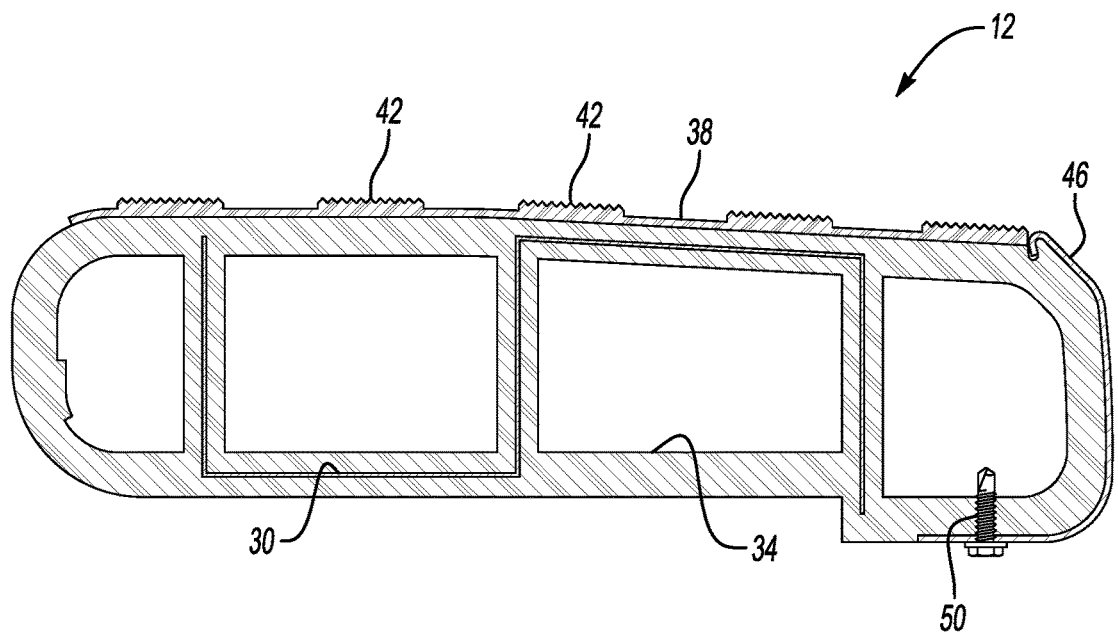
FIG. 3 illustrates a section view at line 3-3 in FIG. 2.
Figure 4:
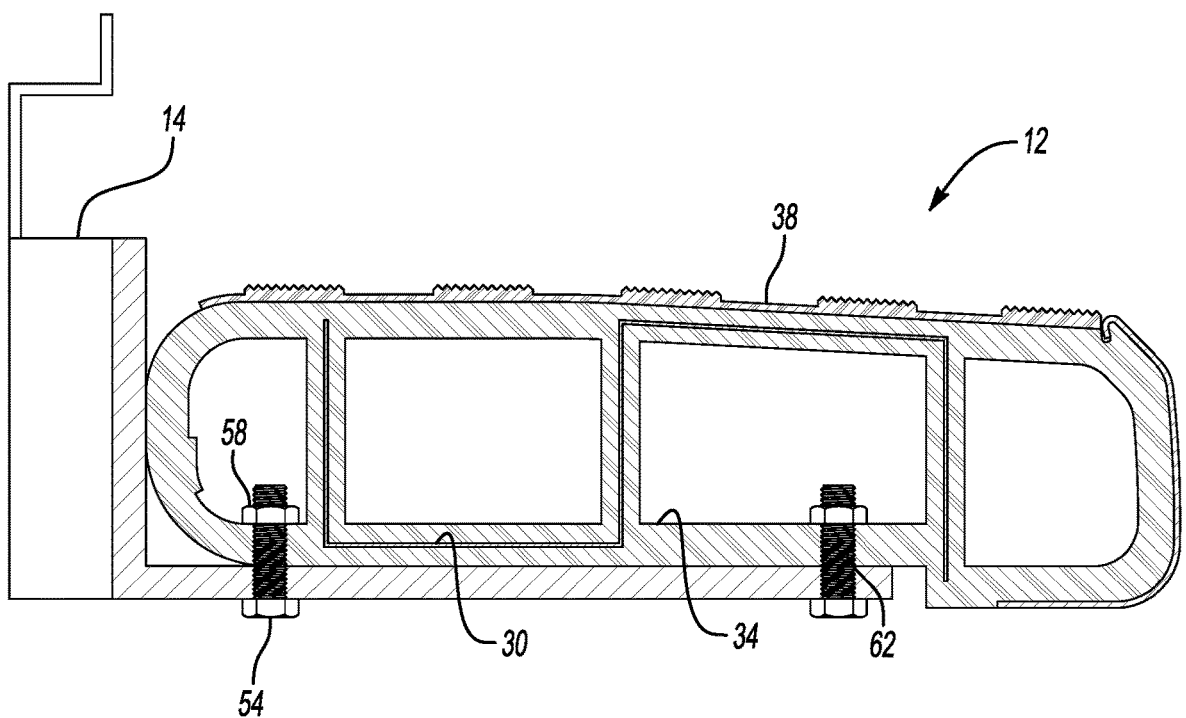
FIG. 4 illustrates a section view at line 4-4 in FIG. 2.

With reference now to FIGS. 2-4, the vehicle running board assembly 12 includes a reinforcing insert 30, a beam 34, and a step pad 38. The example insert 30 is a metal or metal alloy. The insert 30 can be steel, for example. The insert 30 is roll-formed to provide a desired cross-sectional profile.

The beam 34 is a polymer-based material. In an example, the beam is a fifteen-percent glass-filled polypropylene. The beam 34 is extruded over the reinforcing insert 30. The insert 30 is encapsulated within the beam 34 in this example.

A material composition of the beam 34 can include an adhesive resin that helps to bond the beam 34 to the reinforcing insert 30. An example adhesive resin is sold under the trade name ADMER™ QF551A, which includes a modified polypropylene-base with anhydride group.

In some examples, the material composition of the beam 34 can include ten-percent adhesive resin. The adhesive resin can improve a peel strength of the material of the beam 34 to a from 1 N/15 mm to 6 N/15 mm.

The step pad 38 is extruded over the beam 34. The step pad 38 is extruded over the beam 34 prior to the beam 34 fully cooling. The step pad 38 can bond to the beam 34 as the beam 34 cools. The extruding of the beam 34 and the step pad 38 can be considered a coextrusion.

The step pad 38 can be a thermoplastic elastomer. The step pad 38, in the exemplary embodiment, is bonded to a vertically upper surface of the beam 34. The step pad 38 can be a "skin" that covers the vertically upper visible surface of the beam 34. Vertical is with reference to ground and an ordinary orientation of the vehicle 10 during operation.

A user can step on the step pad 38 when using the running board assembly 12 to enter and exit the vehicle 10. To provide traction for the user, the example step pad 38 includes a plurality of ribs 42.

In the exemplary embodiment, a decorative accent strip 46 is secured to an outboard side of the base 34 utilizing at least one mechanical fastener 50. The decorative strip conceals the outboard edge of the beam 34 which, if not covered, can be visible and aesthetically displeasing. The at least mechanical fastener 50 can be a self-tapping screw that bites into the material of the beam 34.

A plurality of mechanical fasteners 54 secure the attachment brackets 14 to an underside of the beam 34. The mechanical fasteners 54 can be bolts that attach to U-nuts 58 within an interior area of the beam 34. The fasteners 54 can extend through apertures 62 within the beam 34 to engage the U-nuts 58.

Notably, in this example, the fasteners 54 do not extend through the reinforcing insert 30. As the reinforcing insert 30 is a metal or metal alloy, machining apertures in the metal insert 30 may be less desirable than confining the apertures 62 to the beam 34, which is polymer-based.

Figure 5:
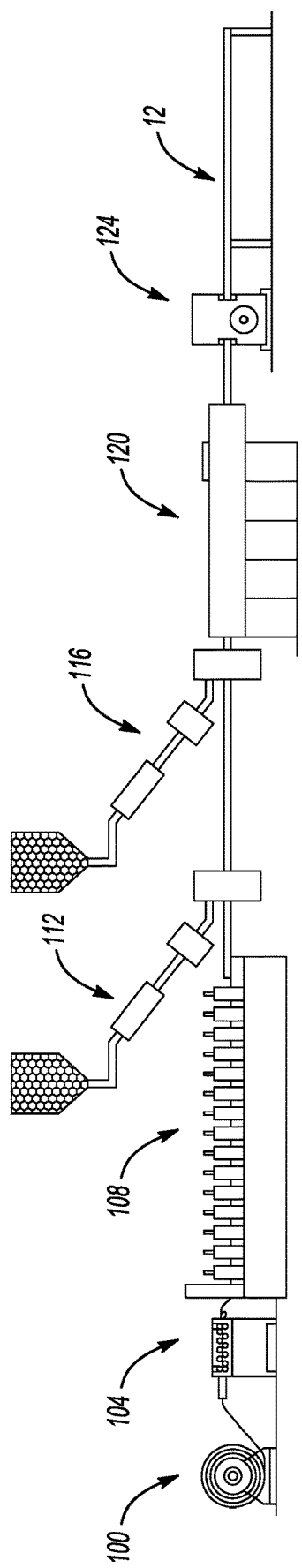
FIG. 5 illustrates a side schematic view showing stations used to manufacture the running board of FIGS. 1-4.

With reference now to FIG. 5 and continued reference to FIGS. 1-4, the stages of a vehicle running board manufacturing method include an unrolling stage 100 where a sheet of material is unrolled from a roll. The material then passes through a flattening stage 104 and then through a roll forming stage 108 to provide the reinforcing insert 30 having a desired cross-sectional profile.

Next, at a first extrusion stage 112, a cross-head extruder extrudes the beam 34 over the reinforcing insert 30. The beam 34 and the reinforcing insert 30 then passes through a second extrusion stage 116 where a cross-head extruder extrudes the step pad 38 is extruded onto the beam 34. Again, the beam 34 is not fully cooled when the step pad 38 is extruded onto the beam 34. The process can thus be considered a co-extrusion process.

The beam 34, the step pad 38, the beam 34, and the reinforcing insert 30 then pass through a cooling stage 120, which includes a cooling bath. After cooling, a cutoff stage 124 cuts the running board assembly 12 to the desired longitudinal length. End caps may be used to cover the cut ends. The cutoff stage 124 can use a cut-off saw to cut the extruded beam provide to the desired longitudinal length.

As can be appreciated, manufacturing a running board having a longer longitudinal length can be accomplished through adjustments at the cutoff stage 124. Substantial machining changes are not required to provide running boards having different lengths.

Features of the disclosed examples include providing a running board having an appearance similar to known running boards, but at a reduced cost to manufacture. The running board includes a reinforcing insert that improves a stiffness of the running board. The addition of the step pad extruded over a polymer-based beam can provide a desired OEM level Class-A surface.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle running board assembly, comprising:
a reinforcing insert;
a beam that is extruded over the reinforcing insert; and
a step pad that is extruded over the beam.

2. The assembly of claim 1, wherein the reinforcing insert is roll-formed.

3. The assembly of claim 1, wherein the reinforcing insert is metal or metal alloy.

4. The assembly of claim 1, wherein the beam is polymer-based.

5. The assembly of claim 1, wherein the beam comprises a glass-filled polypropylene.

6. The assembly of claim 1, wherein the beam comprises an adhesive resin that bonds the beam to the reinforcing insert.

7. The assembly of claim 6, wherein the beam encapsulates the reinforcing insert.

8. The assembly of claim 1, wherein the step pad includes a plurality of ribs.

9. The assembly of claim 1, wherein the step pad is a thermoplastic elastomer.

10. The assembly of claim 1, further comprising a plurality of vehicle attachment brackets secured to the beam with a plurality of mechanical fasteners.

11. The assembly of claim 10, wherein the mechanical fasteners are spaced a distance from the reinforcing insert such that the mechanical fasteners do not extend through any portion of the reinforcing insert.

12. The assembly of claim 10, wherein each of the mechanical fasteners is received within a bore that does not extend through the reinforcing insert.

13. A vehicle running board manufacturing method, comprising:
extruding a beam over a reinforcing insert;
extruding a step pad over the beam; and
cutting the beam, the reinforcing insert, and the step pad to provide a running board.

14. The method of claim 13, further comprising roll-forming the reinforcing insert prior to extruding the beam over the reinforcing insert.

15. The method of claim 13, wherein the step pad bonds to the beam when extruding the step pad over the beam.

16. The method of claim 13, further comprising securing the running board to a plurality of vehicle attachment brackets using a plurality of mechanical fasteners.

17. The method of claim 16, further comprising securing without the mechanical fasteners extending through the reinforcing insert.

18. The method of claim 13, further comprising incorporating an adhesive resin into the beam, the adhesive resin bonding the beam to the reinforcing insert.

19. The method of claim 13, wherein the beam and the step pad are polymer-based, wherein the reinforcing insert is a metal or metal alloy.

* * * * *